3,740,401
2-(N-CYCLOALKYL-PHENYLAMINO)-2-IMIDAZO-LINES-(2) AND SALTS THEREOF

Helmut Stahle, Herbert Koppe, Werner Kummer, and Klaus Stockhaus, Ingelheim am Rhein, Germany, assignors to Boehringer Ingelheim G.m.b.H., Ingelheim am Rhein, Germany
No Drawing. Filed Nov. 18, 1970, Ser. No. 90,845
Claims priority, application Germany, Nov. 19, 1969, P 19 58 212.8
Int. Cl. C07d 49/34, 57/48
U.S. Cl. 260—254     19 Claims

ABSTRACT OF THE DISCLOSURE

Compounds of the formula

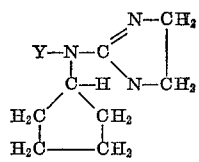

or

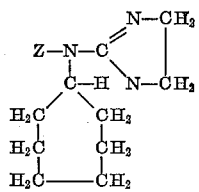

wherein
Y is 2,6-dichloro-phenyl, 2-chloro-6-methyl-phenyl, 2-chloro-4-methyl-phenyl, 2-methyl-4-chloro-phenyl, 2-chloro-phenyl, 2,4-dichloro-phenyl, 2-methyl-phenyl, 2,6-diethyl-phenyl, 4-bromo-phenyl, 2,6 - dichloro-4-bromo-phenyl, 4-cyano-phenyl, 4-fluoro-phenyl, 2-trifluoromethyl-phenyl, 2-methoxy-4-chloro-phenyl or 2-chloro-3-methyl-phenyl, and
Z is

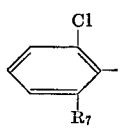

where $R_7$ is chlorine or methyl,
and their non-toxic, pharmacologically acceptable acid addition salts; the compounds as well as their salts are useful as analgesics.

---

This invention relates to novel 2-(N-cycloalkylphenylamino)-2-imidazolines and non-toxic acid addition salts thereof, as well as to a method of preparing these compounds.

More particularly, the present invention relates to a novel class of 2-(N-cycloalkyl-phenylamino)-2-imidazolines of the formula

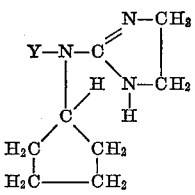

(I)

or

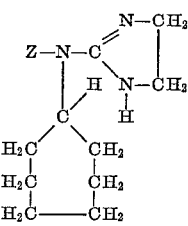

(Ia)

wherein
Y is 2,6-dichloro-phenyl, 2-chloro-6-methyl-phenyl, 2-chloro - 4 - methyl-phenyl, 2-methyl-4-chloro-phenyl, 2-chloro-phenyl, 2,4-dichlorophenyl, 2-methyl-phenyl, 2,6 - diethyl-phenyl, 4 - bromo-phenyl, 2,6-dichloro-4-bromo-phenyl, 4-cyano-phenyl, 4-fluoro-phenyl, 2-trifluoromethyl-phenyl, 2-methoxy-4-chloro-phenyl or 2-chloro-3-methyl-phenyl, and
Z is

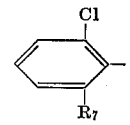

where $R_7$ is chlorine or methyl,
and their non-toxic, pharmacologically acceptable acid addition salts.

Especially preferred are compounds of the formula

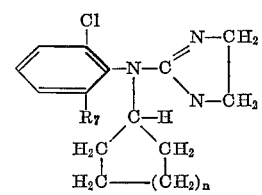

(Ib)

wherein
$R_7$ is chlorine or methyl, and
$n$ is 1 or 3,
and their non-toxic, pharmacologically acceptable acid addition salts.

The compounds of the Formulas I and Ia may be prepared by reacting a 2-phenylamino-2-imidazolines of the formula

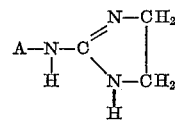

(II)

wherein A has the meanings defined by Y and Z above,

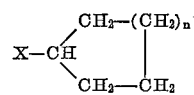

(III)

wherein X is a halogen atom, preferably chlorine or bromine and $n$ has the same meaning as in Formula Ib.

The reaction is advantageously carried out by heating the reactants in the presence of an organic solvent and an acid binding agent to elevated temperatures, preferably to about 45° C. and the boiling temperature of the reaction mixture. The most advantageous specific reaction conditions depend largely upon the reactivity of the individual reactants and are most advantageously determined by preliminary tests.

The alkylation takes place exclusively at the nitrogen bridge atom, which can be proven by means of NMR spectroscopy; in case of substitution at the nitrogen bridge atom the methylene protons of the imidazoline ring appear as a singulet at about 6 p.p.m. ($\tau$-scale).

The 2-(N-cycloalkyl-phenylamino)-2-imidazolines defined by Formula I are bases and therefore form acid addition salts with inorganic and organic acids. Such addition salts may be prepared in conventional manner, that is, for example, by dissolving the free bases in a solvent and acidifying the solution with the desired acid. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, oxalic acid, valeric acid, capronic acid, malonic acid, succinic acid, glutaric acid, maleic acid, fumaric acid, lactic acid, tartaric acid, citric acid, malic acid, benzoic acid, p-hydroxybenzoic acid, phthalic acid, cinnamic acid, salicylic acid, ascorbic acid, 8-chlorotheophylline or the like.

The following examples further illustrate the present invention and will enable others skilled in the art to understand it more completely. It shoud be understood, however that the invention is not limited solely to the particular examples given below.

EXAMPLE 1

2-[N-(2,6-dichlorophenyl)-N-(cyclopentyl)-amino] 2-imidazoline (a) 46 g. (0.2 mol) of 2-(2,6-dichlorophenylamino) 2-imidazoline are refluxed with 44.6 g. (150%) of bromocyclopentane and 23.2 g. (110%) of sodium carbonate in 100 ml. of n-butanol for 8 hours. Hereupon, inorganic salts are filtered off and the filtrate is evaporated to dryness in vacuo. The residue is dissolved in diluted hydrochloric acid and the solution is adjusted to pH 7 with 2 N sodium hydroxide solution. At this pH-value it is extracted several times with ether and the ether extracts, containing unreacted starting imidazoline, are discarded. After complete separation of the starting imidazoline, the aqueous solution is alkalized, after treatment with active charcoal with 5 N sodium hydroxide solution. The new imidazoline base separating crystalline is sucked off, washed with water and dried. Thus, there is obtained thin-layer chromatographically uniform 2-[N-(2,6-dichlorophenyl)-N-(cyclopentyl)-amino] - 2 - imidazoline of M.P. 121–123° C. Yield: 33.0 g. (corresponds to 55.5% of theory).

(b) 6.9 g. (0.03 mol) of 2-(2,6-dichlorophenylamino)-2-imidazoline are dissolved together with 7.35 g. (150%) of bromocyclopentane in 25 ml. of absolute methanol and the reaction mixture in a bomb tube is heated for 16 hours on the boiling water bath.

After this time, excess starting material and solvent is evaporated in vacuo and the remaining residue is dissolved in diluted hydrochloric acid. By means of fractionated ether extraction at various pH-values the novel imidazoline is separated from the starting imidazoline (proof by thin-layer chromatography).

The ether extracts containing the cyclopentyl-imidazoline base are united, dried over drierite and evaporated in vacuo. There remain 1.3 g. of 2-[N-(2,6-dichlorophenyl)-N-cyclopentyl-amino]-2-imidazoline of M.P. 121–123° C.

Analogous to Example 1, the following compounds, listed in the table, may be synthetized:

Compounds represented by formula:

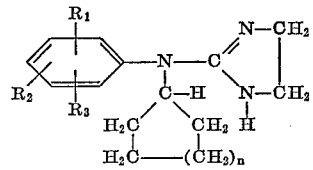

| Example No. | $R_1$ | $R_2$ | $R_3$ | $n$ | M.P. (in ° C.) | Yield (in percent of theory) |
|---|---|---|---|---|---|---|
| 2 | 2-Cl | 6-CH₃ | H | 1 | 100–102 | 42.0 |
| 3 | 2-Cl | 4-CH₃ | H | 1 | 116–117 | 36.1 |
| 4 | 4-Cl | 2-CH₃ | H | 1 | 102–104 | 45.5 |
| 5 | 2-Cl | H | H | 1 | 103–105 | 41.7 |
| 6 | 2-Cl | 4-Cl | H | 1 | 124–125 | 24.6 |
| 7 | 2-Cl | 6-Cl | H | 3 | ¹ 210–213 | 20.6 |
| 8 | 2-CH₃ | H | H | 1 | 79–81 | 41.1 |
| 9 | 2-Cl | 6-CH₃ | H | 3 | 195–197 | 16.2 |
| 10 | 2-C₂H₅ | 6-C₂H₅ | H | 1 | Oil | 23.4 |
| 11 | 4-Br | H | H | 1 | 133–134 | 27.4 |
| 12 | 2-Cl | 4-Br | 6-Cl | 1 | 112–113 | 35.4 |
| 13 | 4-C≡N | H | H | 1 | 132–135 | 22.5 |
| 14 | 4-F | H | H | 1 | 107–110 | 43.6 |
| 15 | 2-CF₃ | H | H | 1 | 103–105 | 45.6 |
| 16 | 2-OCH₃ | 4-Cl | H | 1 | 101–104 | 37.7 |
| 17 | 2-Cl | 3-CH₃ | H | 1 | 126–127 | 61.8 |

¹ Nitrate.

The compounds according to the present invention, that is, those represented by Formula I above and their non-toxic, pharmacologically acceptable acid addition salts have useful pharmacodynamic properties. More particularly, the compounds of the instant invention exhibit analgesic activities in warm-blooded animals, such as mice and rats.

For pharmaceutical purposes the compounds according to the present invention are administered to warm-blooded animals perorally, enterally of parenterally, preferably perorally, as active ingredients in customary dosage unit compositions, that is, those consisting essentially of an inert pharmaceutical carrier and one effective dosage unit of the active ingredient, such as tablets, coated pills, capsules, waters, powders, solutions, suspensions, emulsions, syrups, suppositories and the like. One effective oral dosage unit of the compounds according to the invention is from 0.0084 to 1.66 mgm./kg. body weight, preferably 0.084 to 0.42 mgm./kg. body weight.

The following examples illustrate a few dosage unit compositions comprising a compound of the present invention as an active ingredient and represent the best mode contemplated of putting the invention into practical use. The parts are parts by weight unless otherwise specified.

EXAMPLE 18

Coated tablets

The tablet composition was compounded form the following ingredients:

| | Parts |
|---|---|
| 2 - [N-(2,6-dichlorophenyl)-N-cycopentyl)-amino]-2-imidazoline | 15 |
| Lactose | 60 |
| Corn starch | 125 |
| Secondary calcium phosphate | 40 |
| Soluble starch | 3 |
| Magnesium stearate | 3 |
| Colloidal silicic acid | 4 |
| Total | 250 |

Preparation: The imidazoline compound is intimately admixed with the lactose, the corn starch, the calcium phosphate and the silicic acid, the mixture is thoroughly kneaded with an aqueous 10% solution of the soluble starch, and the resultant moist mass is granulated through a 1.5 mm.-mesh screen and dried. The granulates is admixed with the magnesium stearate, and the resulting composition is compressed into 250 mgm.-tablets which are then coated with a thin shell consisting essentially of a mixture of sugar and talcum. Each coated tablet contains 15 mgm. of the imidazoline compound. When administered perorally to a warm-blooded animal of about 60 kg. body weight in need of such treatment a very effective analgesic action was produced.

EXAMPLE 19

Hypodermic solution

The solution is compounded from the following ingredients:

| | Parts |
|---|---|
| 2 - [N - (2-chloro-6-methylphenyl)-N-cyclohexyl)-amino]-2-imidazoline | 5.0 |
| Sodium chloride | 18.0 |
| Distilled water s.q. ad. 2000 parts by vol. | |

Preparation: The imidazoline compound and the sodium chloride are dissolved in a sufficient amount of distilled water, the solution is diluted to the indicated volume with additional distilled water, filtered until free from suspended matter, and the filtrate is filled into 2 ml.-ampules in an atmosphere of nitrogen. The filled ampules are then sealed and sterilized for 20 minutes at 120° C. Each ampule contains 5 mgm. of the imidazoline compound. When the contents thereof were administered intramuscularly to a warm-blooded animal of about 60 kg. body weight in need of such treatment, very effective analgesic action was produced.

EXAMPLE 20

Rectal suppositories

The suppository composition is compounded from the following ingredients:

| | Parts |
|---|---|
| 2 - [N-(2,6-dichlorophenyl)-N-(cyclohexyl)-amino]-imidazoline hydroiode | 3 |
| Lactose | 242 |
| Cocoa butter q.s. ad. 1700. | |

The cocoa butter is melted, the active ingredient and the lactose are added, the mixture is allowed to cool slightly and is then homogenized. Thereafter, the composition is poured into cold suppository molds holding 1700 mgm. each. Every individual suppository contains 3 mgm. of the imidazoline compound.

When administered rectally to a warm-blooded animal of about 60 kg. body weight in need of such treatment, very effective analgesic action was produced.

Analogous results were obtained when any one of the other imidazoline compounds embraced by Formula I or a non-toxic acid addition salt thereof was substituted for the particular imidazoline derivative in Examples 18 through 20. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to those particular embodiments and that various changes and modifications may be made without departing from the spirit of the invention or the scope of the appending claims.

We claim:

1. A compound of the formula $$\begin{array}{c} \text{Y--N--C} \overset{\text{N--CH}_2}{\underset{\text{N--CH}_2}{\diagdown}} \\ \text{H} \quad | \\ \text{C} \quad \text{H} \\ \text{H}_2\text{C} \quad \text{CH}_2 \\ \text{H}_2\text{C---CH}_2 \end{array}$$

or $$\begin{array}{c} \text{Z--N--C} \overset{\text{N--CH}_2}{\underset{\text{N--CH}_2}{\diagdown}} \\ \text{H} \quad | \\ \text{C} \quad \text{H} \\ \text{H}_2\text{C} \quad \text{CH}_2 \\ \text{H}_2\text{C} \quad \text{CH}_2 \\ \text{H}_2\text{C---CH}_2 \end{array}$$

wherein

Y is 2,6-dichloro-phenyl, 2-chloro-6-methyl-phenyl, 2-chloro - 4 - methyl-phenyl, 2-methyl-4-chloro-phenyl, 2-chloro-phenyl, 2,4-dichloro-phenyl, 2-methyl-phenyl, 2,6 - diethyl-phenyl, 4-bromo-phenyl, 2,6-dichloro-4-bromo-phenyl, 4-cyano-phenyl, 4-fluoro-phenyl, 2-trifluoromethyl-phenyl, 2-methoxy-4-chloro-phenyl or 2-chloro-3-methyl-phenyl, and Z is $$\begin{array}{c} \text{Cl} \\ | \\ \diagup\!\!\!\diagdown \\ | \\ \text{R}_7 \end{array}$$

where $R_7$ is chlorine or methyl, or a non-toxic, pharmacologically acceptable acid addition salt thereof.

2. A compound of the formula $$\begin{array}{c} \text{Cl} \\ \diagup\!\!\!\diagdown\text{--N--C} \overset{\text{N--CH}_2}{\underset{\text{N--CH}_2}{\diagdown}} \\ \text{R}_6 \quad \text{H} \quad | \\ \text{C} \quad \text{H} \\ \text{H}_2\text{C} \quad \text{CH}_2 \\ \text{H}_2\text{C---(CH}_2)_n \end{array}$$

where $R_7$ is chlorine or methyl, wherein $R_6$ is chlorine or methyl, and $n$ is an integer of 1 or 3 or a non-toxic, pharmacologocially acceptable acid addition sale thereof.

3. A compound according to claim 2 which is 2-[N-(2,6-dichlorophenyl) - N - (cyclopentyl)-amino]-2-imidazoline or a non-toxic, pharmacologically acceptable acid addition salt thereof.

4. A compound according to claim 2 which is 2-[N-(2-chloro - 6 - methylphenyl)-N-(cyclopentyl)-amino]-2-imidazoline or a non-toxic, pharmacologically acceptable acid addition salt thereof.

5. A compound according to claim 2 which is 2-[N-(2,6-dichlorophenyl) - N - (cycloheptyl)-amino]-2-imidazoline or a non-toxic, pharmacologically acceptable acid addition salt thereof.

6. A compound according to claim 2 which is 2-[N-(2-chloro - 6 - methylphenyl)-N-(cycloheptyl)-amino]-2-imidazoline or a non-toxic, pharmacologically acceptable acid addition salt thereof.

7. A compound according to claim 1 which is 2-[N-(2-chloro - 4 - methylphenyl)-N-(cyclopentyl)-amino]-2-imidazoline or a non-toxic, pharmacologically acceptable acid addition salt thereof.

8. A compound according to claim 1 which is 2-[N-(2-methyl - 4 - chloro-phenyl)-N-(cyclopentyl)-amino]-2-imidazoline or a non-toxic, pharmacologically acceptable acid addition salt thereof.

9. A compound according to claim 1 which is 2-[N-(2-chlorophenyl) - N - (cyclopentyl)-amino]-2-imidazoline or a non-toxic, pharmacologically acceptable acid addition salt thereof.

10. A compound according to claim 1 which is 2-[N-(2,4-dichlorophenyl) - N - (cyclopentyl)amino]-2-imidazoline or a non-toxic, pharmacologically acceptable acid addition salt thereof.

11. A compound according to claim 1 which is 2-[N-(2-methylphenyl) - N - (cyclopentyl)-amino]-2-imidazoline or a non-toxic, pharmacologically acceptable acid addition salt thereof.

12. A compound according to claim 1 which is 2-[N-(2,6-diethylphenyl) - N - (cyclopentyl)-amino]-2-imidazoline or a non-toxic, pharmacologically acceptable acid addition salt thereof.

13. A compound according to claim 1 which is 2-[N-(4-bromophenyl) - N - (cyclopentyl)-amino]-2-imidazoline or a non-toxic, pharmacologically acceptable acid addition salt thereof.

14. A compound according to claim 1 which is 2-[N-(2,6 - dichloro-4-bromo-phenyl) - N - (cyclopentyl)-amino]-2-imidazoline or a non-toxic, pharmacologically acceptable acid addition salt thereof.

15. A compound according to claim 1 which is 2-[N-(4-cyanophenyl) - N - (cyclopentyl)-amino]-2-imidazoline or a non-toxic, pharmacologically acceptable acid addition salt thereof.

16. A compound according to claim 1 which is 2-[N-(4-fluorophenyl) - N - (cyclopentyl)-amino]-2-imidazoline or a non-toxic, pharmacologically acceptable acid addition salt thereof.

17. A compound according to claim 1 which is 2-[N-(2-trifluoro-methylphenyl) - N - (cyclopentyl)-amino]-2-imidazoline or a non-toxic, pharmacologically acceptable acid addition salt thereof.

18. A compound according to claim 1 which is 2-[N-(2-methoxy-4-chlorophenyl) - N - (cyclopentyl)-amino]-2-imidazoline or a non-toxic, pharmacologically acceptable acid addition salt thereof.

19. A compound according to claim 1 which is 2-[N-(2-chloro-3-methylphenyl) - N - (cyclopentyl)-amino]-2-imidazoline or a non-toxic, pharmacologically acceptable acid addition salt thereof.

References Cited
UNITED STATES PATENTS

| | | | |
|---|---|---|---|
| 2,899,426 | 8/1959 | Bloom | 260—309.6 |
| 3,146,240 | 8/1964 | Hageman et al. | 260—309.6 |

FOREIGN PATENTS

| | | | |
|---|---|---|---|
| 623,305 | 4/1963 | Belgium | 260—309.6 |
| 539,179 | 11/1931 | Germany | 260—309.6 |
| 1,016,514 | 1/1966 | Great Britain | 260—309.6 |

OTHER REFERENCES

Urech et al.: Helv. Chim. Acta, vol. 33, pp. 1386–1407 (1950).

Urech et al.: Chem. Abst., vol. 45, columns 2478–9 (1951).

Tronche et al.: Chem. Abst., vol. 55, column 11396 (1961).

Aspinall: J. Amer. Chem. Soc., vol. 73, 602–3 (1951).

NATALIE TROUSOF, Primary Examiner

U.S. Cl. X.R.

260—309.6; 424—253, 273